United States Patent
Burke, Jr.

[15] 3,687,082
[45] Aug. 29, 1972

[54] AUTOMATIC ELECTRIC POWER SUPPLY AND SPEED CONTROL SYSTEM FOR AUTOMATED DRIVERLESS VEHICLES

[72] Inventor: Howard B. Burke, Jr., Danvers, Mass.

[73] Assignee: Avco Corporation, Cincinnati, Ohio

[22] Filed: Sept. 10, 1970

[21] Appl. No.: 70,953

[52] U.S. Cl. ................................. 104/152, 191/25
[51] Int. Cl. ............................ B60l 9/30, B60l 15/02
[58] Field of Search .......... 191/25, 26, 2, 3; 104/149, 104/152

[56] References Cited

UNITED STATES PATENTS

| | | | |
|---|---|---|---|
| 3,263,625 | 8/1966 | Midis et al. | 104/148 R |
| 3,537,401 | 11/1970 | Metzner | 104/149 |
| 560,678 | 5/1896 | Brandenburg | 191/25 |

*Primary Examiner*—Arthur L. La Point
*Assistant Examiner*—George H. Libman
*Attorney*—Charles M. Hogan and Melvin E. Frederick

[57] ABSTRACT

A system for supplying electric power to and automatically controlling the speed of driverless, electrically driven, wheeled vehicles on a guide way. The system includes a power distributing track divided into a plurality of power segments and a plurality of electrical power sources each cyclically operated at different frequencies coupled to different predetermined power segments of the track to create a series of travelling waves, each at a different frequency, in the segmented track. A vehicle including an AC induction driving motor coupled to one power segment of the track receives electrical energy at the particular frequency appearing at a particular moment at a particular power segment. The induction motor in the vehicle continues to receive that particular frequency and, hence, maintain a constant torque so long as the vehicle continues to travel along the track at the desired rate of speed. Should the speed of the vehicle exceed or drop below the desired rate of speed, the induction motor will receive a preceding or succeeding travelling wave of such frequency as to compensate for the increase or decrease in speed thereby causing the induction motor to maintain the desired vehicle speed along the track.

11 Claims, 7 Drawing Figures

INVENTOR
HOWARD B. BURKE JR.

BY Charles M. Hogan
Melvin E. Frederick
ATTORNEY

INVENTOR
HOWARD B. BURKE JR.

INVENTOR
HOWARD B. BURKE JR.

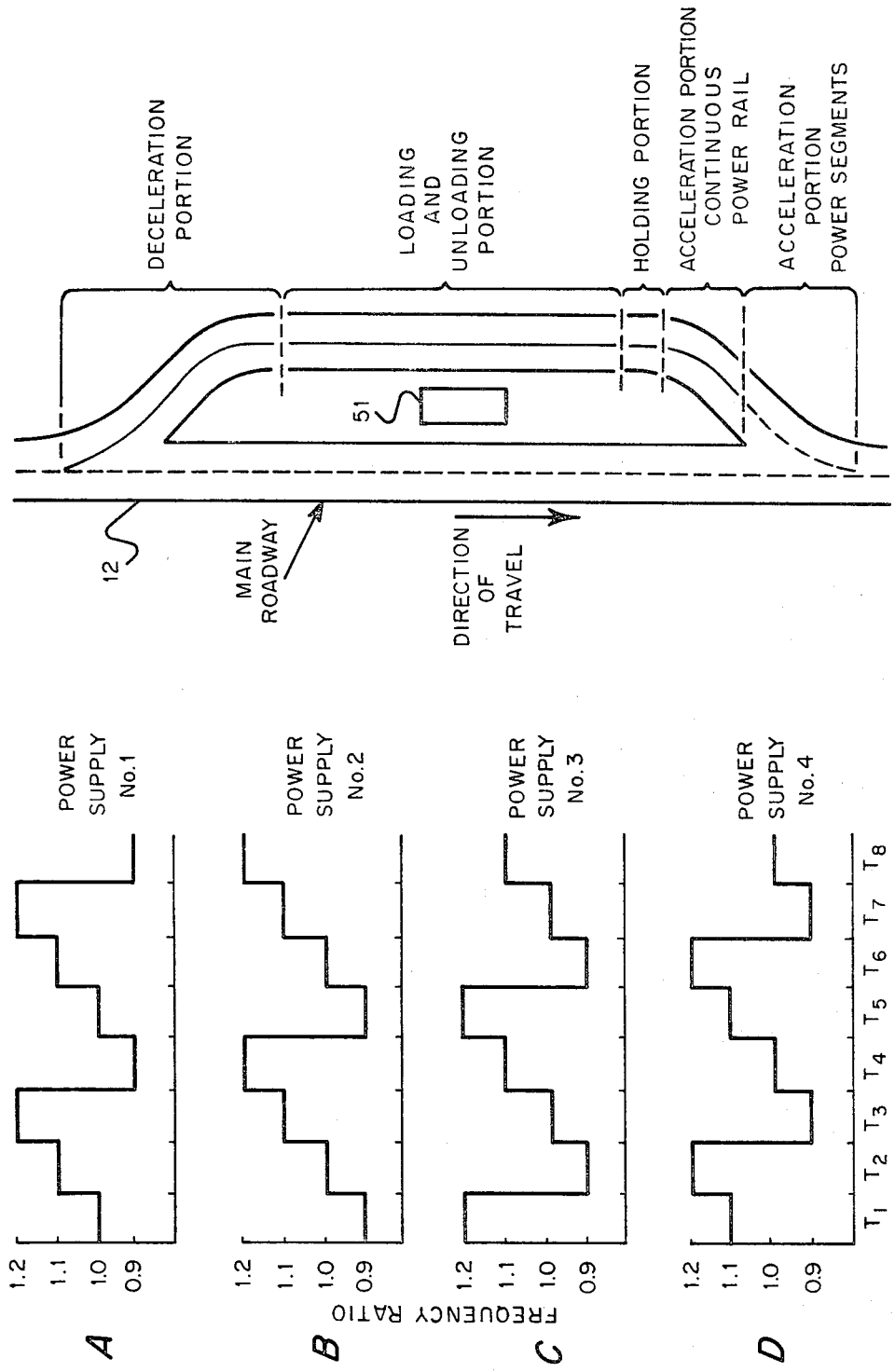

AUTOMATIC ELECTRIC POWER SUPPLY AND SPEED CONTROL SYSTEM FOR AUTOMATED DRIVERLESS VEHICLES

This invention relates to systems for supplying electric power to and automatically controlling the speed of driverless vehicles designed to relieve the growing transportation congestion in high density transportation areas and relates more particularly to completely automatic, private, destination selected, computer controlled vehicle systems.

The present invention provides a novel concept relating to the method of individual mass transportation, the invention combining certain of the advantages of automobile traffic with the nonstop movement of electrified rail traffic such as trains.

Although the invention is primarily designed for the transportation of people, it is to be understood that it is equally useful to transport freight along predetermined paths.

A primary purpose of this invention is to transport people or freight in a most convenient, highly desirable and comfortable manner utilizing a minimum amount of route space and requiring a minimum amount of travel time. Thus the invention is characterized by the feature of making optimum use of time and space in regards to passenger time and route space respectively.

The various transportation systems presently employed in urban areas and elsewhere throughout the United States have many built-in disadvantages which are functions of their basic designs. No single system presently in use satisfies all of the requirements of the public and in particular the individuals thereof in regard to cost, convenience and more particularly passenger time and the public route space required. Some of the transportation systems presently in use were designed over a hundred years ago. Such systems are adequate in some cases. However, in other cases the systems are inadequate due to the demand placed upon them by the members of the public. Street cars and trains operating in and around or between urban areas move along predetermined railed paths. While trains and street cars have increased their speed of travel during recent years, the net gain has been lost in the longer routes which have been required. This type of transportation system involves movement of "groups" of people, generally 30 or more, and the vehicle utilized therein must stop to load or unload even a single passenger from the street car or train, as the case may be. Thus the continued starting or stopping of the street car or train is a distinct disadvantage and inconvenience to members of the public.

Many street car lines have been replaced by buses. In addition, with the increased use of automobiles, the advent of the modern federal expressway system and also the increased use of aircraft, the use of street cars as well as trains has continually decreased. In particular, automobiles have become more popular than street cars and the like due not only to the fact that members of the public have more economic means available for acquiring such vehicles, but also because the automobile will take the driver and passengers where they wish to go in a reasonable period of time. In addition, the automobile is generally always available and thus has the distinct advantage over a street car and a train which generally run periodically.

Supersonic airplanes and in fact any type of airplane will take a passenger from airport to airport in a relatively short period of time. However, it is difficult and extremely time consuming for a passenger to travel from an urban area to an airport which is generally located many miles from the core city, or, for that matter from the parking area of the airport to the passenger's desired terminal. Thus, while travelling by commercial airplanes is becoming extremely popular, it should be appreciated that a commercial airplane will only take a person almost to his destination in a short period of time and that considerable and in some cases greater periods of time are required by a passenger to travel from the airport parking area to his terminal.

Monorails, elevateds, overheads and the like are in use today in various urban areas. However, such systems have many disadvantages including switching vehicles, route space required, and in particular cost of construction, maintenance and operation. Thus, the systems presently in use have certain advantages. However, such systems also have disadvantages which are particularly inconvenient during the critical hours of use.

While the present transportation systems have been improved in recent years, such improvements have merely related to a change of timing or route. There is generally no alternative since each of the systems is limited by the very basic design thereof.

The present invention has overcome many of the problems inherent with the transportation systems mentioned previously. The automatically controlled vehicle system of the present invention provides features relating to low construction, maintenance and operational costs, minimum travel and waiting time, maximum convenience, and in addition permits the use of vehicles designed to provide privacy for a small number of passengers. The automatic speed control feature of the present invention virtually guarantees that vehicles cannot collide one with another; the manner in which the vehicles are powered provides the control function thereby eliminating the necessity of a separation control loop which in turn thereby improves reliability; and since vehicles within the system move in an exactly predictable manner, substantial simplification of the overall system is achieved.

The present invention has considerable merit in that it can be constructed and arranged at generally no loss of tax base to a city or additional cost necessitated by the removal of buildings. In addition, the system does not create re-location problems and the cost per mile for installation and operation is extremely low.

It is an object of the present invention to provide a new and improved method and system of transportation.

It is another object of the invention to provide a system wherein the starting, routing, running and stopping of a vehicle is controlled automatically and in accordance with the full capabilities of the propulsion system utilized therewith.

It is a further object of the invention to provide an automatic control system for vehicles wherein computing and regulating apparatus as well as sensing apparatus of the control system is not carried in the vehicle.

It is still another object of the invention to provide an automatic control system for vehicles adapted to provide for high-operating performance together with the desired level of passenger comfort.

It is still another object of the invention to provide a positive, dynamic responsive speed control system for vehicles operating at predetermined headways.

A still further object of the invention is to provide a speed control system wherein the manner in which power is supplied to the vehicles provides the control function.

A still further object of the invention is to provide an automatically controlled vehicle system wherein the power supply means is adapted to maintain nearly uniform velocity and spacing for all vehicles in the main line of the loop.

A further object of the invention is to provide an automatically controlled vehicle system wherein the vehicles are provided with electric propulsion motors that in combination with the power supply therefor provides controlled high power and reversing or braking torque at low cost and high reliability.

The novel features that are considered characteristic of the invention are set forth in the appended claims; the invention itself, however, both as to its organization and method of operation, together with additional objects and advantages thereof will best be understood from the following description of a specific embodiment when read in conjunction with the accompanying drawings, in which:

Figure 5:
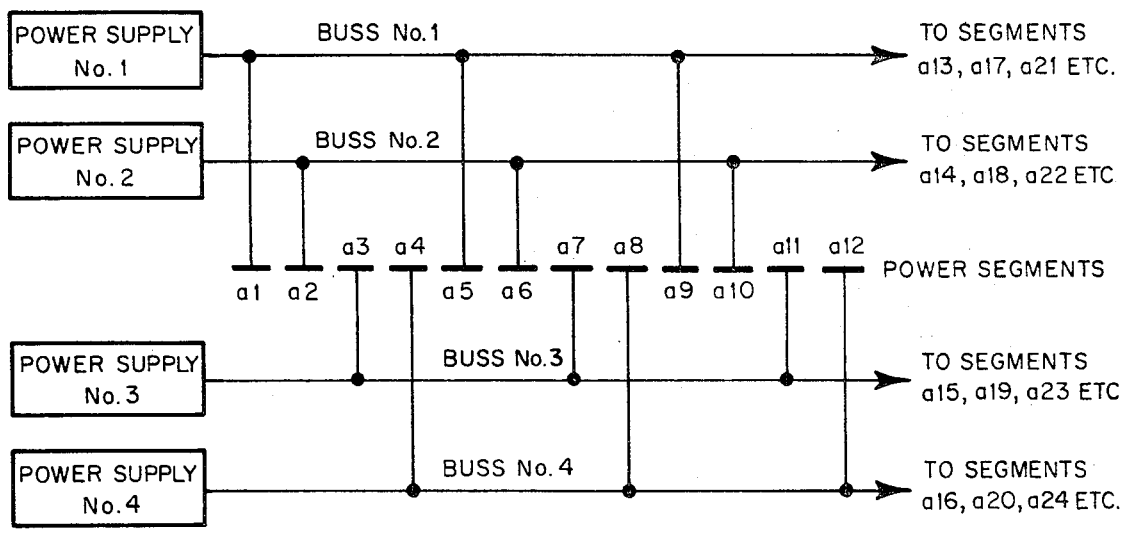
FIG. 5 is a schematic diagram illustrating one arrangement for coupling power segments to a plurality of power sources to provide a series of travelling waves along the roadways.

FIGS. 6A–D are graphs of frequency vs. time for the power supplies shown in FIG. 5; and FIG. 7 is a fragmentary plan view of a section of the system illustrating in particular a portion of the main roadway on which vehicles move and a station for permitting ingress and egress of vehicles to the main roadway.

Broadly stated, the present invention relates to an automatic electric power supply and speed control system for automated driverless vehicles which travel on a roadway arranged to form one or more closed loops and/or a roadway network. In the preferred embodiment, the system includes a power distributing track divided into a plurality of power segments (A) disposed along the roadway and a plurality of electrical power sources each cyclically operated at different frequencies and coupled to different power segments to create in the power distributing track a series of travelling waves, each at a different frequency. Each vehicle includes an AC induction driving motor adapted to receive power from the power segments. If the speed of any given vehicle exceeds or drops below a desired rate of speed, its induction motor will receive a preceding or succeeding travelling wave or AC power of such frequency as to compensate for the increase or decrease in speed thereby causing the induction motor to maintain the desired vehicle speed along the track.

Figure 1:
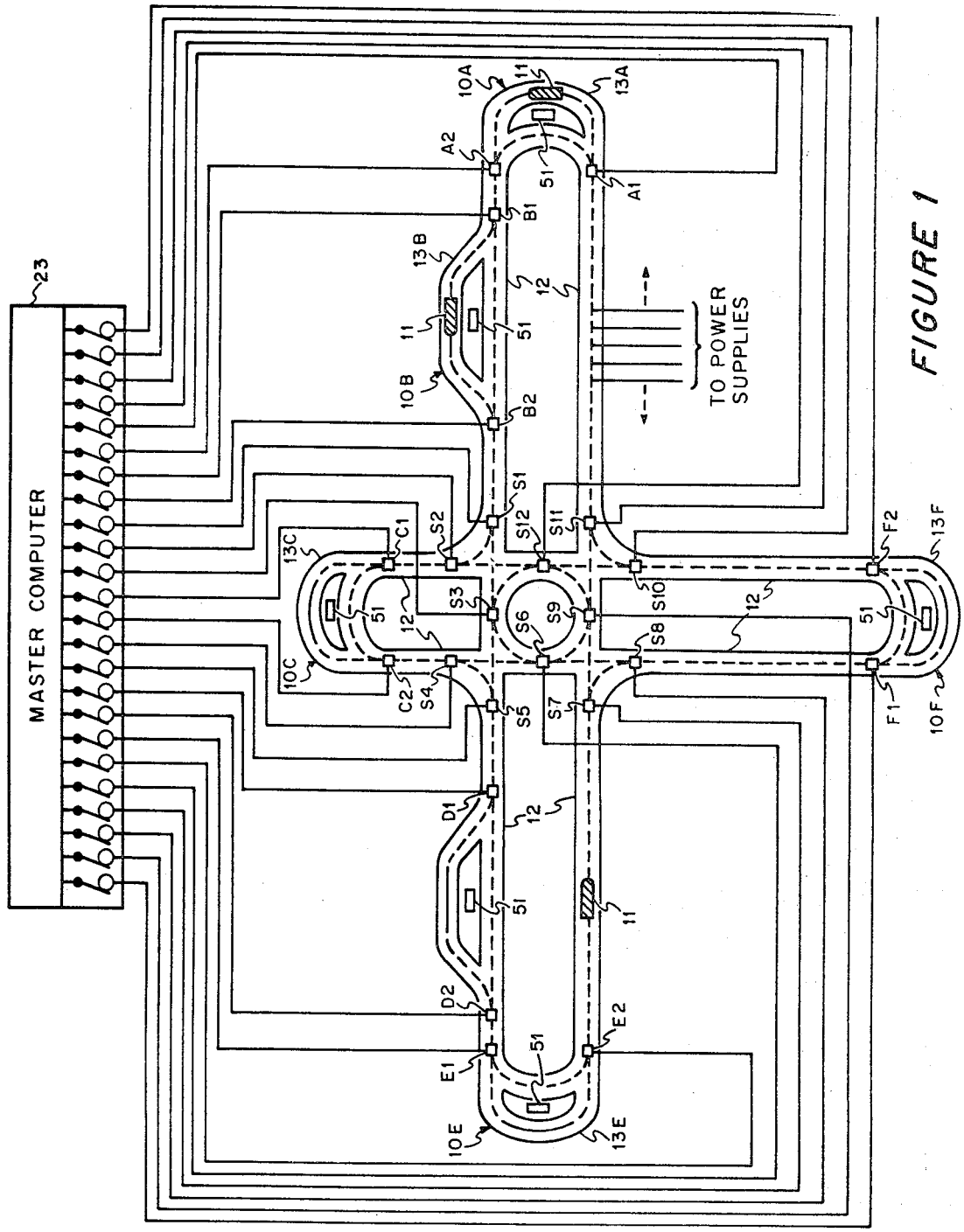
FIG. 1 is a schematic plan view of a closed loop system illustrating a plurality of series of vehicles which are under the control of an electronic computer, and further illustrating loading and unloading stations for permitting ingress and egress of vehicles to the main roadway.

Referring now to the drawings, FIG. 1 illustrates one form of a closed loop system or roadway network. The exact form of the system is dependent upon the location of the system and its environment. The closed loop system comprises a series of station roadways permitting the ingress and egress of vehicles to and from a main roadway. Such stations are designated by the numerals 10A–F. The closed loop may have any number of stations depending on the particular application. The stations may be used for loading and/or unloading people and/or freight as the case may be. The closed loop and certain of the stations have illustrated therein a plurality of vehicles 11 more further described hereinafter which are of a capacity to comfortably handle freight and/or a small number of passengers.

Any number of intersections, merging locations, or crossovers may be provided between any number of branches of the system. The particular purpose of the intersections is to permit specific routing and/or rerouting of the vehicles 11. In addition, the intersections permit the controlled routing of the vehicles 11 in the event of a power failure at a particular portion of the system. Thus, while FIG. 1 illustrates six stations 10A–10F, it should be appreciated that any number of stations may be provided as the situation dictates with one or more intersections being provided between different portions or branches of the closed loop for the reasons mentioned previously.

It should be further understood that any system in accordance with the invention may have a plurality of closed loops with various connected intersections between such loops to facilitate the transfer of vehicles when conditions demand from one closed loop to another closed loop. Vehicles in each loop may operate at a substantially fixed speed.

A roadways network may comprise all the roadways where vehicles are required to pass or stop such as, for example, as shown in FIG. 1, main roadways 12, bypass or station roadways 13A–13F, or side tracks, maintenance shop, depot and the like (not shown). The roadways need have overpass or underpass construction only if and where special conditions dictate. Typically, the roadways may be built to provide a smooth, rolling surface and excellent resistance to impact, abrasion and water assaults. Vehicles operating on the roadways may be given lateral guidance in any of several ways, typically, as by a probe linked to the steering mechanism of the vehicle and riding in a slot or groove provided in the roadway. In any event, the vehicles will be of the wheeled type. Provided typically along the middle line and along the whole length of the roadways is a narrow groove or slot 14 which accepts the vehicle's guide probes and, among other things, provides mechanical guidance of the vehicle. A typical groove shown in cross-section in FIG. 2 may be 1 inch wide and 7 inches deep. The guiding groove member 15 shown in cross-section in FIG. 2 may be manufactured separately in U-shape, 20-foot long, extrusions and installed in a trench 16 prepared during the roadway construction. A space 17 between each U-shaped member 15 and the trench 16 may be provided to allow for adjustments in alignment, variations and terminal expansions, and water drainage. Easily accessible anchor bolts 18 hold the members 15 in place and provide the necessary capability for their replacement. No moving parts need be provided in the guiding groove since all switching from one roadway to another may be done by each vehicle responding to appropriate external signals. With such an arrangement, the vehicles can be practically touching each other in case of heavy traffic or the like, yet any vehicles in a row can be switched from one roadway to another without interfering with the direction assigned to the remaining vehicles.

Figure 2:
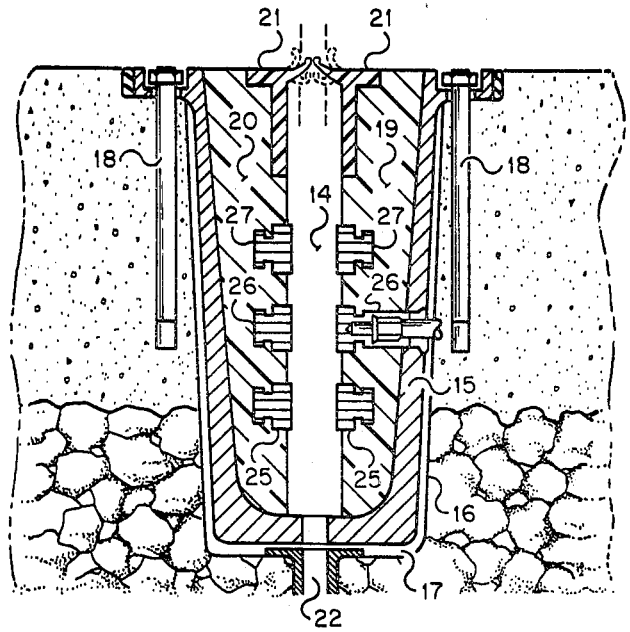
FIG. 2 is a vertical sectional view of a guiding groove or guide way for guiding vehicles along the roadways and coupling electric power and signals to the vehicles.

The guiding groove or guide way 14 defined by dielectric liners 19 and 20 as shown by way of example in FIG. 2 may be divided in depth into three levels. The guiding part of the groove comprising the upper third in depth is lined on both sides with a thick, L-shaped, neoprene edge 21 whose upper corner terminates into a flexible lip slightly wider than one-half the width of the groove. As a result, the two opposite flexible lips as shown in solid lines touch and push against each other the whole length of the roadways thus closing the groove and preventing rain, sand, dust, or other foreign objects from falling into the groove. Any rain which may seep through is promptly absorbed by multiple draining holes 22 provided at the bottom of the groove. The flexible lips are separated only locally and temporarily as the guide probe of the vehicle passes by; they may be slightly displaced but not separated as a person steps on the groove or if an automobile passes over it.

Below the flexible lips are provided power supply lines 25 and 26 on each side of the groove and a communication signal line 27 on each side of the groove.

In accordance with the present invention, the necessity of sensitive control electronics within the vehicles is eliminated, thereby permitting lower vehicle cost, improved reliability and improved safety, all power and control being supplied via the guide way groove. A series of travelling waves each at a different frequency or moving waves of frequency-modulated alternating current in accordance with the invention is used to control speed, provide minimum safe vehicle operations, normal starting and stopping, and emergency stopping. Switching may be provided in accordance with the invention by the guide way independently of the vehicle via electromagnetic means disposed in the guide way and interacting with the steering/pick-up probe of the vehicle to pull it in the proper direction at a junction.

Figure 3:
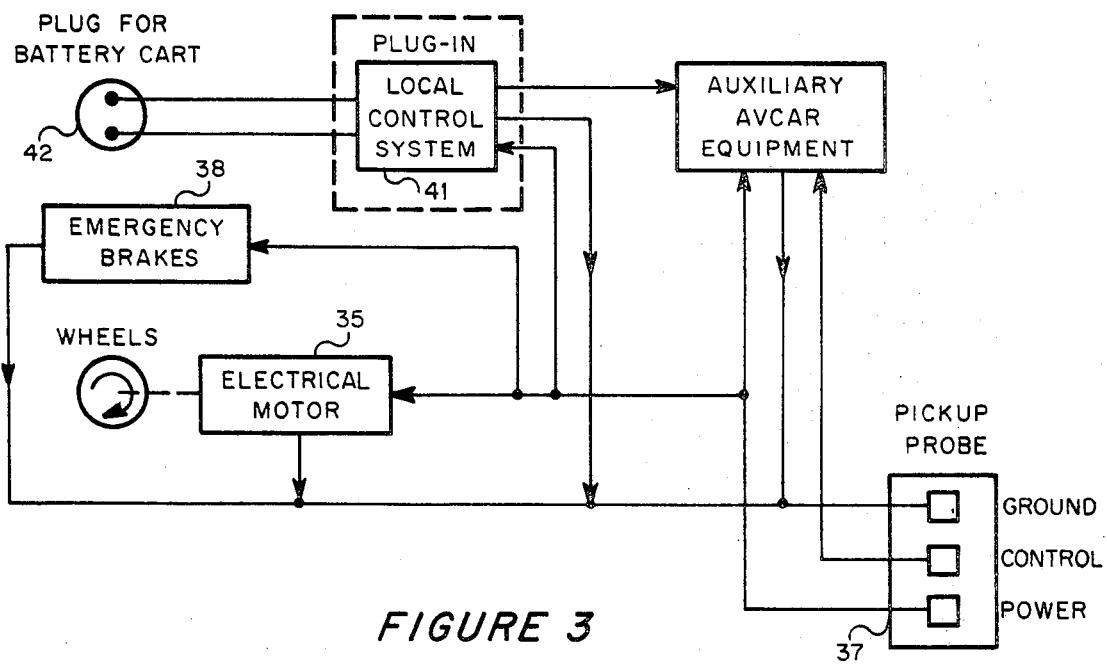
FIG. 3 is a block diagram illustrating a typical vehicle electrical system.

A block diagram of a typical vehicle electrical system is shown in FIG. 3. The motor 35 takes power from the probe 37 to control the speed of the vehicle. The lack of power to the vehicle will apply the emergency brakes 38 which typically may be held off by electrical power and applied by spring tension (not shown) adjusted to provide safe, but quick, stops. Auxiliary vehicle equipment 39 comprising, for example, lighting, door actuation, lighted signs and the like are coupled to the pick-up probe 37. When desired or necessary, local control may be provided by a plug-in local control system 41 which may comprise a small variable-frequency oscillator, plug for a battery cart 42, and switches required to allow battery operation of the car driving off the guide way. The local control system 41 as shown is not a permanent part of the vehicle.

The electric motor 35 in the vehicles are of the AC induction type which provide high powered and reversing or braking torque at low cost and high reliability.

Figure 4:
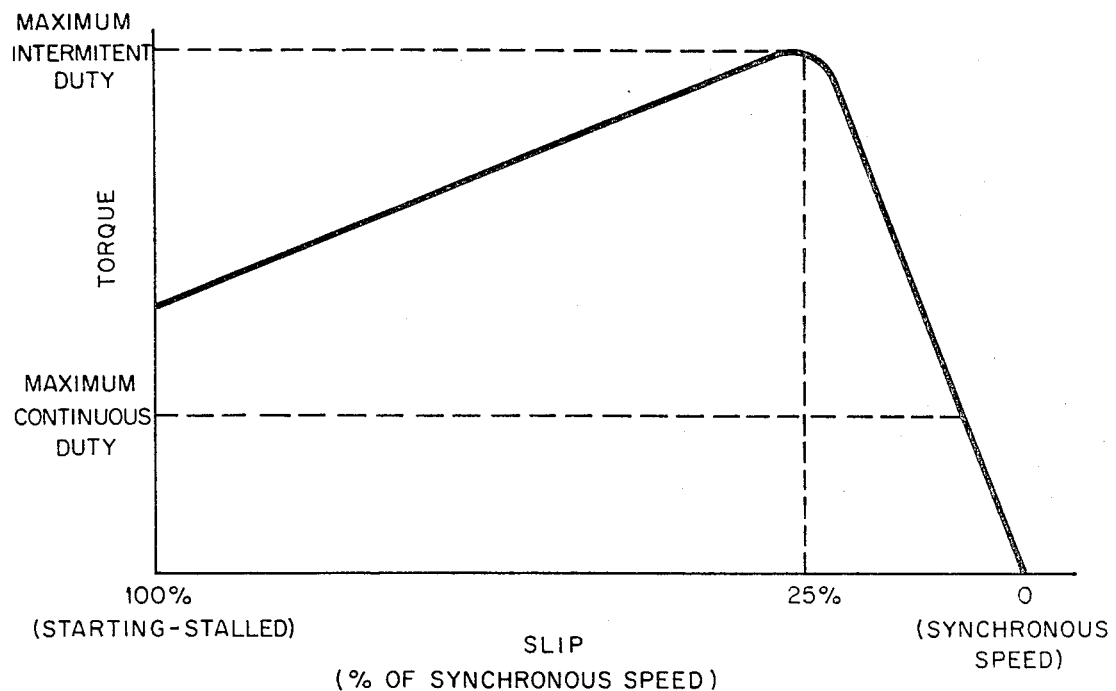
FIG. 4 is a graph of slip vs. torque delivered by a typical vehicle AC induction propulsion motor.

As can be seen from FIG. 4 which is a typical AC induction motor slip-torque diagram, such a motor produces no torque when it is at synchronous speed such as 3,600 RPM for a two pole motor powered by 60 cycle AC power. As shown in FIG. 4, torque increases as the motor speed lags the AC frequency until slip reaches some value, typically 25–50 percent, and thereafter torque decreases to the stalled or starting torque value.

The power segments A1–A12 of the power distributing track shown schematically in FIG. 5 serve as the powered surfaces upon which the vehicle power pick-up probe 37 rides and collects power for the vehicle induction motor 35. The length of the power segments will vary as a function of system design but typically will not be less than 0.5 feet or longer than 5.0 feet. The number of power busses will also be a function of total system design, but typically will vary from about 5 to 50 per AC phase. Accordingly, a three-phase system might require from 15 to 150 busses. As illustrated in FIGS. 5 and 6, each buss designated as buss Nos. 1, 2, 3, and 4 is supplied by a separate and variable AC power supply designated as power supply Nos. 1, 2, 3, and 4. It is the function of the power supplies to vary in the proper sequence the frequency and voltage, if desired, of the buss being powered.

The sequence of frequency variation shown in FIG. 6 is shown by way of example for a four buss system. As shown in FIG. 6, variations in frequency more fully described hereinafter are related to a system synchronous speed of 1.0 times $T_1$–$T_8$ are time periods selected for each system application. The power supplies and their associated busses may be of any conventional form. Thus, for systems requiring only small amounts of power, solid state power supplies may be used while in very high power applications, solid state power supplies or possibly several AC generators providing various frequencies may be switched to the appropriate busses via solid state switches. The proper generator frequency may, for example, be obtained by driving AC alternators at different speeds or by driving several alternators each with a different number of pairs of poles at the same speed.

Referring now particularly to FIGS. 1, 5, and 6 for purposes of explanation, assume that a vehicle is accelerated from station 10A and enters the main roadway 12 at time $T_2$ travelling at a velocity of 4 feet per second. Entry onto the main roadway is coordinated so that the vehicle power pick-up is coupled to power segment No. A2 (see FIG. 5) at time $T_2$ (see FIG. 6), at the frequency of 1.0 (see FIG. 6). The frequency 1.0 is assumed to be 100 cycles per second, each time interval 1.0 second long, each power segment 4 feet long, and the vehicle provided with an induction motor-gearing wheel diameter selected such that when no wheel torque is needed to drive the vehicle (as might occur going down a slight grade), it will move at a velocity of 4 feet per second when supplied with 100 c.p.s. AC power. As previously noted, the vehicle on this example is assumed to enter the main roadway at time $T_2$ on power segment No. A2 travelling at 4 feet per second. At this velocity, the vehicle will progress forward 4 feet and its power probe will be coupled to power segment No. A3 1 second after roadway entry or at time $T_3$. As shown in FIG. 6, power segment No. A3 is supplying motor power from power supply No. 3 at the synchronous frequency of 1.0 at time $T_3$. Accordingly, such a no-load vehicle will continue to receive power having the proper characteristics to maintain its velocity at 4 feet per second. At time $T_4$, the vehicle will have moved onto power segment No. A4 and again, as may be seen from FIG. 6, will again collect power at the synchronous frequency 1.0.

The vehicle as set forth in the example above will be propelled at a constant velocity down the roadway always receiving the power which it requires to maintain this speed. If now, for example, the force required to propel the vehicle at the aforementioned velocity is increased, the driving motor in the vehicle must provide some torque. As may be seen from FIG. 4, the motor torque at the synchronous speed 1.0 is 0; hence, the vehicle will slow down. When the vehicle slows to a speed less than 4 feet per second, it will be seen from FIGS. 5 and 6 that the vehicle will not stay synchronized with the power segments that provide synchronous power but will fall back onto a segment that is receiving power from a buss at a higher frequency. This will cause the motor in the vehicle to be operated with higher electrical slip as will be seen from reference to FIG. 4. If the vehicle motor now provides just the right amount of torque, the vehicle will stabilize at 4 feet per second on a power segment offering power at 1.1 times synchronous speed. If the vehicle motor provides too much torque causing the vehicle to move faster than 4 feet per second, the vehicle advances to the segment operating at synchronous frequency where it will once again slow down to less than 4 feet per second and as a result slowly oscillate between power segments offering power at 1.0 and 1.1 of the synchronous frequency. If the vehicle motor still does not provide adequte torque at 1.1 times synchronous frequency, it will continue to fall back until it reaches the segment that offers power at 1.2 times synchronous frequency thereby developing more torque which, in a properly designed vehicle, will cause the vehicle to move at a velocity equal to or greater than the rate of progression of the power segments, which, in the present example, is 4 feet per second.

Table I set forth below shows the frequency sequence at the power segments of FIG. 5 for the time intervals of FIG. 6.

TABLE I

| Power segments | A1 | A2 | A3 | A4 | A5 | A6 | A7 | A8 | A9 |
|---|---|---|---|---|---|---|---|---|---|
| Time $T_1$ | 1.0 | 0.9 | 1.2 | 1.1 | 1.0 | 0.9 | 1.2 | 1.1 | 1.0 |
| Time $T_2$ | 1.1 | 1.0 | 0.9 | 1.2 | 1.1 | 1.0 | 0.9 | 1.2 | 1.1 |
| Time $T_3$ | 1.2 | 1.1 | 1.0 | 0.9 | 1.2 | 1.1 | 1.0 | 0.9 | 1.2 |
| Time $T_4$ |  | 0.9 | 1.2 | 1.1 | 1.0 | 0.9 | 1.2 | 1.1 | 1.0 | 0.9 |
| Time $T_5$ | 1.0 | 0.9 | 1.2 | 1.1 | 1.0 | 0.9 | 1.2 | 1.1 | 1.0 |
| Time $T_6$ | 1.1 | 1.0 | 0.9 | 1.2 | 1.1 | 1.0 | 0.9 | 1.2 | 1.1 |

The preceding discussion illustrates by way of example the mechanism by which a vehicle is, in accordance with the invention, locked into a travelling "power section" (delineated by the broken lines in Table I). A power section is defined as those power segments which define the bounds within which a vehicle is restricted at any given point in time. For example, from the time $T_1$ to $T_6$, the power segments of FIG. 5 will be powered as in Table I when powered by power supplies modulated as shown in FIG. 6.

As may be seen from Table I, at time $T_1$, one complete power section comprises power segments A3, A4, A5, and A6. This power section progresses to the right so that at time $T_2$, for example, it is comprised of power segments A4, A5, A6, and A7. At time $T_3$, this power section is comprised of power segments A5, A6, A7 and A8, etc. A vehicle that is introduced onto the main roadway at time $T_1$ in the above-described power section will remain locked into it and progress to the right at the rate of progression of the power section. For the case of the example, the rate of progression is 4 feet per second.

A second vehicle may be inserted into the power section immediately behind or immediately in front of the power section mentioned above; hence, for this example, headway for a fully loaded system is four power segments or 16 feet. However, the actual headway between any two vehicles may be more or less due to the fact that vehicles will position themselves within the power section as a function of their individual torque requirements as shown above.

It is considered important to remove vehicles from the main roadway for loading and unloading in order to maintain uninterrupted service in the system. As may now be apparent, it is essential that vehicles introduced onto the main roadway are introduced within a time window and at a velocity which will allow capture of the vehicle in the intended power section. Vehicles leaving the system will be moving at synchronous system speed; and hence, must be decelerated to a stop.

Attention is now directed to FIG. 7 which illustrates a typical station for providing deceleration-acceleration as may be required for a station or the like. A vehicle moving down the main roadway 12 and that is programed to enter a station for unloading, loading, or the like is switched from the main roadway via suitable switching means into the deceleration portion of the branch or station roadway. Suitable switching means may comprise, for example, magnets the actuation of which are controlled by the master computer 23 (see FIG. 1) embedded in the guide way just prior to the exit to the station. The magnets when actuated cause the vehicle's probe to follow the guide way leading to the station. The deceleration portion of the station guide way may be supplied with power having a frequency substantially below the synchronous frequency of that for the main roadway. Such low frequency power will cause the vehicle motor to act as a dynamic brake and generate power that is dissipated back into the power supply network. Control of vehicle movement in each loading-unloading portion of the station guide way is provided by a separate station control computer 51 or by a separate program in the master control computer 23. The control function may vary as a function of the system use.

When a vehicle is actuated to re-enter the main roadway, it proceeds under control of station control computer 51 (or 23) to the holding portion of the station guide way where it is held until the master computer 23 controlling the system determines that a properly timed empty power section is passing the station. At this time, the master computer 23 assumes control of the vehicle and supplies power to the acceleration portion of the station guide way to accelerate the vehicle out of the holding portion. The power for the acceleration portion of the station guide way may be provided at a single frequency at or slightly lower than that of the synchronous frequency. Alternately, the power may be initially supplied at a low frequency and increased in frequency as the vehicle accelerates toward the main roadway. While an increasing frequency will cause the vehicle motor to operate closer to its peak torque, the desirability of supplying acceleration power in this manner is a function of system design.

The first part of the acceleration portion as shown in FIG. 7 may, for example, include a continuous power rail powered from a single power supply. With such an arrangement, it is possible that as the vehicle nears the main roadway, its velocity may be too fast or too slow depending upon how fast it accelerated which is a function of such variables as vehicle load, motor efficiency, etc. Accordingly, the last part of the acceleration portion may be formed of a plurality of power segments as shown in FIG. 7 that are powered in parallel with the power segments in the main roadway. Thus, if a vehicle's exit velocity is equal to the power section progression rate described in connection with Table I, when the vehicle enters the main roadway, it will not accelerate. If, on the other hand, the vehicle's exit velocity is too low, it will continue to accelerate; and if the vehicle's exit velocity is too high, it will decelerate. As may now be seen, a vehicle will be introduced onto the main roadway at the right time and at substantially the right velocity.

As is apparent with any automatic transportation system, a great deal of programming and switching is required to properly route the vehicles in the system. As previously noted, switching is under the control of the master computer 23 as shown in FIG. 1 which illustrates diagrammatically one form of a closed loop system in accordance with the invention. The closed loop system as shown in FIG. 1 by way of example comprises six stations designated successively as stations 10A – 10F inclusive. The system further includes crossovers and/or intersections which connect different segments of the system. Located at each of the stations is a station control computer 51 (unless station control is handled by computer 23) which is coupled to the master computer 23. As an example, the master computer 23 may take the form of an IBM Computer No. 1130 which is well known in the art. The main purpose of the master computer is to direct the flow of vehicles through the system without any traffic jams. This is accomplished in conventional manner by use of various timing devices, switches, and traffic monitoring devices which sense the traffic pattern and traffic flow. The actual switching and traffic monitoring apparatus which may be any one of many conventional designs is, in any event, dependent upon the method for guiding the vehicle.

Consider now a typical sequence of operation in directing a vehicle from station 10A in FIG. 1 to station 10F. Thus, a vehicle at station 10A is first loaded and programed via the master computer 23 to proceed to station 10F. The vehicle then proceeds from the loading and unloading area toward the acceleration portion under station control and waits at the holding portion for power to be applied to that portion and the acceleration portion by the master computer. The master computer couples power to the appropriate sections when it has determined that a clear schedule to station 10F is available. Upon having determined that a clear schedule to station 10F is available, the vehicle is accelerated along the acceleration portion and enters the main roadway at switch point A2 at roadway synchronous velocity. The master computer causes the switches and/or traffic monitoring means at B1, B2, S1, S3, S6, S8, and F1 to be timely actuated to cause the vehicle travelling at constant synchronous speed to follow the correct route to station 10F. Upon reaching station 10F, the vehicle enters the deceleration portion and decelerates down to station velocity, the station control computer thereafter properly positioning the vehicle for off-loading or on-loading as required and returns the vehicle to the holding portion of the station roadway at the appropriate time. The master computer 23 is the key to the routing of vehicles through the system. The logic that may be used by the master computer in accordance with the present invention is relatively simple due to the fact that all vehicles within the system operate in a totally predictable manner. Thus, in accordance with the invention, when a vehicle is introduced on the main roadway, it can be determined at the time exactly how far it will proceed in a given amount of time. For this reason, the entire system can be described by a matrix containing a list of all switch or merging locations that moves with time. Table II below sets forth in part a matrix for the system of FIG. 1 and Table III below shows three routes and times for the system of FIG. 1. For purposes of clarity and simplicity, a perhaps over-simplified example will now be described wherein distances and times are defined in such a manner as to facilitate easy understanding of the operation of the system. Thus, for this example, the distance from A2 to B1 is assumed to be 4 feet, thereby resulting in a transit time of 1 second at a synchronous roadway velocity of 4 feet per second. All distances in FIG. 1 are selected to be 4 feet between switch positions or possible merging locations with the exception that the distance between E2 to S7 and S11 to A1 is 16 feet and the distance between S8 to F1 and F2 to S10 is 8 feet. The above-noted distances result in the transit times set forth in Table III. The rate of acceleration of a vehicle when entering the main roadway is also selected to be 4 feet per second per second whereby at the moment the computer starts a vehicle into the system, the vehicle will actually arrive at the main roadway 1 second later travelling at a velocity of 4 feet per second.

TABLE II

| Time | A1 | A2 | B1 | B2 | C1 | C2 | D1 | D2 | E1 | E2 | F1 | F2 | S1 | S2 | S3 | S4 | S5 | S6 | S7 | S8 | S9 |
|---|---|---|---|---|---|---|---|---|---|---|---|---|---|---|---|---|---|---|---|---|---|
| Present time TO | | Accel. pwr. on | | | | Accel. pwr. on | | | | Accel. pwr. on | | | | | | | | | | | |
| Present time plus 1 sec | | X S-L | | | | O S-L | | | | Z S-L | | | | | | | | | | | |
| Present time plus 2 sec | | | X S-L | | | | | | | | | | | | | | | | | | |
| Present time plus 3 sec | | | | X S-R | | | | | | | | | | | | | | | | | |
| Present time plus 4 sec | | | | | | | | | | | | | | | | | O S-L | | | | |
| Present time plus 5 sec | | | | | | | | | | | | | | | X S-L | | | | | | |
| Present time plus 6 sec | | | | | | | | | | | O S-R | | | | | | | O S-R | | | |
| Present time plus 7 sec | | | | | | | | | | | | | | | | | | | X S-R | | |
| Present time plus 8 sec | | | | | | | | | | | | | | | | | | X S-R | | X S-R | |
| Present time plus 9 sec | | | | | | | | | | | X S-R | | | | | | | | | | |
| Present time plus 10 sec | | | | | | | | | | | Z S-R | | | | | | | | | Z S-L | |

TABLE III

| Travel Time | Routing Station 10A to Station 10F | Routing Station 10E to Station 10F | Routing Station 10C to Station 10F |
|---|---|---|---|
| — | A2 | E2 | C2 |
| 1 Sec. | B1 | — | S4 switch positions or possible merging locations |
| 2 Sec. | B2 | — | S6 |
| 3 Sec. | S1 | — | S8 |
| 4 Sec. | S3 | — | — |
| 5 Sec. | S6 | S7 | F1 |
| 6 Sec. | S8 | S8 | |
| 7 Sec. | — | — | |
| 8 Sec. | F1 | F1 | |

Consider now the control logic that would apply in routing to station 10F vehicles positioned on the acceleration strips of stations 10A, 10C, and 10E. For purposes of simplicity, it is assumed that initially there is no traffic in the system and that the vehicle in station 10A requests routing an instant before the vehicle in station 10C which in turn requests routing an instant before the vehicle in station 10E.

Upon the request from the vehicle in station 10A, the master computer reserves merging and switching locations for those times that the vehicle in station 10A will arrive at those locations along its route and will also identify the switching positions required and actuate the switches at these positions at the appropriate time to properly route this vehicle to station 10F. Having selected the route, the computer then directs power to the acceleration portion of the roadway at station 10A to be turned on; the vehicle proceeds down the roadway at a constant velocity of 4 feet per second; the appropriate switches as selected by the computer are properly positioned or energized immediately prior to arrival of the vehicle; and the vehicle leaves the main roadway through switch F1 9 seconds after application of acceleration power at station 10A. The request by the vehicle in station 10C is almost simultaneously processed by the master computer. The computer scans the matrix with the route requirement for the vehicle in station 10C and determines if there is a clear roadway available if the vehicle starts down the roadway at time $T_0$. The computer matrix shown in Table II contains reserved slots (denoted by X's) for the vehicle leaving station 10A. Upon determining that no merging conditions will occur, the computer reserves switch, times and conditions (denoted by O's) for the vehicle in station 10C and directs that power be appropriately applied to the acceleration portion at station 10C. Accordingly, this vehicle starts accelerating at time $T_0$ and arrives at switch F1 in station F in 6 seconds or 3 seconds prior to the arrival of the vehicle from station 10A.

The vehicle in station 10E now repeats the process of requesting from the computer for the third time a route to station 10F. The computer determines, however, that if this vehicle starts to accelerate at $T_0$, it will arrive at switch S8 in 7 seconds and that the vehicle from station 10A has already reserved this switch. To avoid a collision, the computer accordingly reviews the status of the roadway if acceleration power is applied at station 10E 1 second later. Having done this, the computer determines that if power is applied to the acceleration portion at station 10E in 1 second, which is to say time $T_0 + 1$ second, the vehicle in station 10E will avoid the other vehicles. Accordingly, the computer reserves switches for the vehicle from station 10E (denoted by Z's), schedules switch positions for the appropriate times, and directs power to be applied to the acceleration portion at station 10E at time $T_0 + 1$ second. The vehicle from station 10E will arrive at switch F1 at $T_0 + 10$ seconds immediately behind the vehicle from station 10A. The vehicle from station 10E will travel from switch S8 to F1 behind the vehicle from station 10A at the minimum system headway of 4 feet.

The computer matrix is up-dated each second, i.e., 1 second after the display time depicted in Table II the signal to apply acceleration power at station 10A and station 10C will disappear; $T_0$ will show S–L at A2 and C2 and acceleration power on at E2; all other lines will move up. The system is continuously up-dated and all actions appear at the top of the matrix when they must be implemented.

As may readily be seen from the above, the control system is an extremely simple one having numerous advantages over other systems. Thus, once a vehicle is introduced into a system, there is no need to monitor its position or provide any control signals to the vehicle. In fact, there is very little, if any, need to have vehicle identity in the computer although this may be done if desired. Further, the computer may be an extremely simple one and may, for example, be little more than a diode matrix. Since the knowledge of vehicle position is completely predictable, a second computer may easily be provided to monitor system performance by receiving the same inputs as the master computer, check the master computer to insure that a merging condition is not scheduled due to the failure of the master computer. The second computer may also monitor a direct power segment after each switch position is actuated to insure that vehicles are actually following the intended route.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In an automatic vehicle operation system for controlling the speed of vehicles travelling in a single direction over a plurality of roadways, the combination comprising:
   a. a plurality of successive aligned electrical power segments spaced one from another along at least a substantial portion of the length of said roadways;
   b. a vehicle having a driving vehicle induction motor for traveling along said roadways;
   c. means for coupling said power segments to induction motor means in a vehicle adapted to travel and travelling along said roadways; and
   d. electrical power source means coupled to said power segments for producing a plurality of frequency varying waves effectively travelling along said power segments, the frequency of said travelling waves varying cyclically at said power segments whereby said vehicle induction motor will receive power of a frequency as to decrease its torque for an increase in vehicle speed and increase its torque for a decrease in vehicle speed from the effective speed of said travelling wave as its travels along said power segments.

2. The combination as defined in claim 1 and additionally including a guide way extending along the length of said roadways for receiving guiding means attached to said vehicles, said guide way including switching means at the junction of roadways for switching a vehicle on one roadway to the other roadway; and electric computer means operatively connected to said switches and said power source means for controlling said vehicles.

3. The combination as defined in claim 2 wherein said power segments comprise part of said guide way.

4. The combination as defined in claim 1 wherein said power source means comprises a plurality of separate electrical power sources.

5. The combination as defined in claim 3 wherein said guide way is a slot disposed in the surface of said roadway, first and second spaced apart electrically nonconductive members define said slot and carry said power segments, and an L-shaped flexible member carried by each of said nonconductive members, said L-shaped members normally closing the end of said slot adjacent said roadway surface.

6. The combination as defined in claim 5 and wherein said roadways provide a hard, smooth rolling surface.

7. In an automatic vehicle operation system for controlling the speed of vehicles travelling in a single direction over a plurality of roadways, the combination comprising:
   a. a plurality of successive electrical power segments spaced one from another along at least a substantial portion of the length of said roadways;
   b. a vehicle having a driving vehicle induction motor for traveling along said roadways;
   c. means for coupling said power segments to induction motor means in a vehicle adapted to travel along said roadways; and
   d. a plurality of electrical power source means coupled to said power segments for producing a series of travelling waves along said power segments, each wave being at a frequency different from that of the other waves, said induction motor receiving with respect to a predetermined wave a preceding or succeeding wave of a frequency as to decrease the torque of said induction motor for an increase in vehicle speed and to increase the torque of said induction motor for a decrease in vehicle speed from the effective speed of said predetermined wave as it travels along said power rails.

8. The combination as defined in claim 7 wherein at any given time the frequency of each power source means is different by a given amount with respect to any other power source means.

9. The combination as defined in claim 8 and additionally including a guide way extending along the length of said roadways for receiving guiding means attached to said vehicles, said guide way including switching means at the junction of roadways for switching a vehicle on one roadway to the other roadway; and electric computer means operatively connected to said switches and said power source means for controlling said vehicles.

10. The combination as defined in claim 9 wherein said power segments comprise part of said guide way.

11. The combination as defined in claim 10 wherein said guide way is a slot disposed in the surface of said roadway, first and second spaced apart electrically nonconductive members define said slot and carry said power segments, and an L-shaped flexible member carried by each of said nonconductive members, said L-shaped members normally closing the end of said slot adjacent said roadway surface.

* * * * *